United States Patent
Durr et al.

[15] 3,688,362
[45] Sept. 5, 1972

[54] MACHINE TOOL WITH ADDITIONAL TOOL MAGAZINE

[72] Inventors: Alfred W. Durr; Otto Gunsser; Hubert H. Heller, all of Nurtingen/Wurttemberg, Germany

[73] Assignee: Gebruder Heller Maschinenfabrik GmbH, Nurtingen/Wurttemberg, Germany

[22] Filed: July 15, 1969

[21] Appl. No.: 841,939

Related U.S. Application Data

[62] Division of Ser. No. 667,441, Sept. 13, 1967, Pat. No. 3,524,248.

[52] U.S. Cl. ..................................29/26 A, 29/568
[51] Int. Cl. ..................................B23g 3/157
[58] Field of Search ..................29/26, 568, 38 B

[56] References Cited
UNITED STATES PATENTS

| | | |
|---|---|---|
| 3,292,235 | 12/1966 | Riedel .............................29/26 |
| 3,249,997 | 5/1966 | Hutchens........................29/568 |
| 3,332,142 | 7/1967 | Lehmkuhl et al.............29/568 |
| 3,355,798 | 12/1967 | Drechsler......................29/568 |
| 2,402,990 | 7/1946 | Drussner....................29/38 B |
| 3,267,550 | 8/1966 | Whittum et al..........29/568 X |

*Primary Examiner*—Andrew R. Juhasz
*Assistant Examiner*—Z. R. Bilinsky
*Attorney*—Limbach, Limbach and Sutton

[57] ABSTRACT

A machine tool with additional tool magazine is described wherein a tool magazine for special tools is arranged below the spindle with the tools held parallel to the spindle axis and inserted directly from the magazine into the spindle. The magazine is a drum which rotates around an axis parallel to the spindle axis and slides in the direction of this axis with axially parallel fixing grooves for the tool.

13 Claims, 5 Drawing Figures

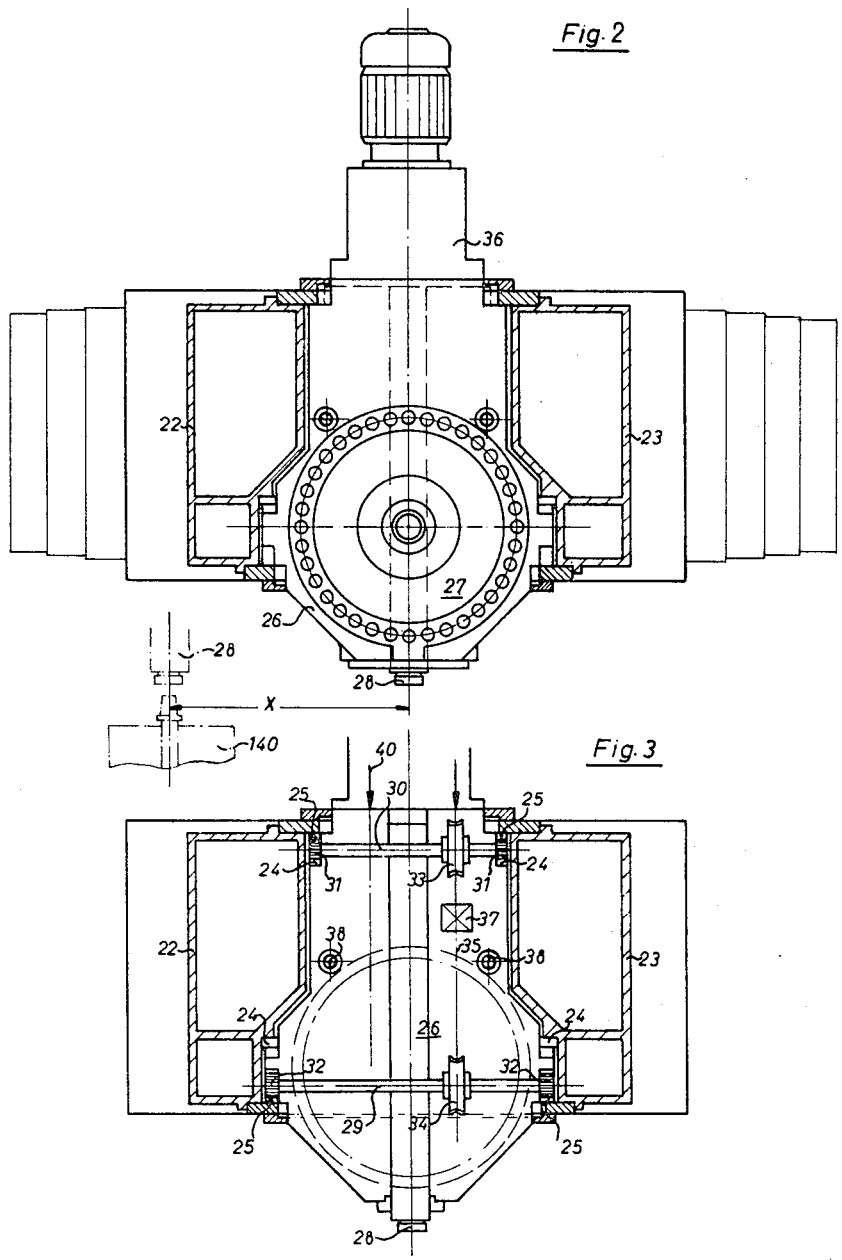

INVENTORS
ALFRED W. DÜRR
OTTO GUNSSER
HUBERT H. HELLER

BY Limbach & Limbach
ATTORNEY

MACHINE TOOL WITH ADDITIONAL TOOL MAGAZINE

This application is a divisional application of our copending application, Ser. No. 667,441 filed Sept. 13, 1967, now U.S. Pat. No. 3,524,248.

This invention relates to a machine tool with automatic tool changing and with an additional magazine for holding special tools.

It has repeatedly been emphasized that the space for a tool in the magazine must be kept relatively small in order to house the requisite variety of tools, in particular drills of differing type and diameter. If the space for an individual tool in the magazine is limited, tools which take up a large amount of space cannot be properly housed in the magazine; this also applies to special tools which usually require a great deal of space. This applies primarily to heavy milling heads which require a great deal of lateral space, but extremely long drill shanks may also present problems. By "special tools" we refer, e.g., to multi-spindle drilling heads or angle drilling heads.

In order to house tools such as these, an additional tool magazine is provided in accordance with the invention.

These special tools are normally only required in relatively small numbers, but handling with the gripper devices presents great difficulties on account of their weight and usually bulky shape. In accordance with the invention, a tool magazine for special tools is therefore arranged below the spindle while the tools are held parallel to the spindle axis and inserted directly from the magazine into the spindle. A tool changing system is known in which the tools are mounted parallel to the spindle axis and inserted directly from the magazine into the spindle. (Swiss patent specifications 258,358 and 348,594 and U.S. Pat. No. 3,074,147.)

If it is anticipated that only special tools of this type will be needed for machining the workpieces, it will, of course, be sufficient to provide a magazine of this type; the magazine for "normal" tools arranged above the spindle can then be omitted.

As mentioned earlier, there are a number of known embodiments for an additional magazine with tools mounted parallel to the spindle axis. However, a new design has proved particularly suitable for a machine tool in accordance with the invention; in this design the tool magazine consists of a drum which rotates around an axis parallel to the spindle axis and slides in the direction of this axis, the drum having axially parallel fixing grooves; these fixing grooves will preferably be T slots or dovetailed grooves. If this magazine, as is usually the case, is designed as an additional magazine for special tools, the drum must either be sufficiently large for the tool spindle to penetrate between the individual tools when working with a "normal" tool from the main magazine, or else, and this is generally a more favorable solution, an idle position must be provided for the additional magazine in which the spindle can move without obstruction in the z-axis through a special tool in the additional magazine.

To mount the tools in the fixing grooves, each tool will preferably be arranged to rotate in a holder which has a fixing pin corresponding to the fixing groove and can be fixed in position on the spindle sleeve. In the case of special tools, such as multi-spindle drilling heads or angle drilling heads, the head itself will naturally be designed as a holder of this kind; but in the case of other tools as well, e.g., heavy milling heads, etc., the holder will again preferably be designed in this form so that it is suitable for fixing the tool perfectly in the magazine, but, in spite of the inevitable imbalance of the holder during rotation, can act perfectly in conjunction with the spindle. Even if two or more holders are arranged symmetrically, it would in practice be very difficult to obtain a design ensuring perfect balance when holders are used.

The holding grooves are only designed to hold the tools on the magazine in the radial and tangential directions; they should not offer significant resistance to movement in the axial direction, so that the tools can be inserted easily and quickly in the spindle or returned to the magazine. It is, however, also desirable to secure the tool in the axial direction in the magazine, and for this purpose, in accordance with a further embodiment of the invention, a roller bolt is provided in the fixing pin; the bolt acts in conjunction with a cam—which has a holding notch at its highest point—in the base of the groove.

If the necessary degree of precision in machining is to be obtained when special tools are used, it is necessary for the tool, i.e., the holder, to be mounted on the spindle sleeve in such way that the actual position differs from the specified position by an extremely small angle only, even with reference to rotation around the axis of the spindle. In order to ensure such a precise position, the holder will preferably have two spring-located index pins and the spindle sleeve two fitting bores corresponding to these pins. When the tools are changed automatically, the index pins can be pressed apart over an inclined plane if the retaining pin is fitted with a roller bolt; however, in accordance with a further embodiment of the invention, as described above, each index pin engages with an angle lever, the other free arm of which engages with the roller bolt. When the tool is transferred from the magazine to the spindle, or vice versa, this automatically ensures that the index pins drop into the fitting bores or are retracted from the latter at exactly the right moment, without a relatively complicated control being required for this purpose.

The invention will be described in greater detail on the basis of a practical embodiment shown by way of example in the drawing. The illustrations are as follows:

FIG. 2 is a sectional view along the line 2—2 in FIG. 1;

FIG. 3 is a sectional view along the line 3—3 in FIG. 1;

Figure 1:
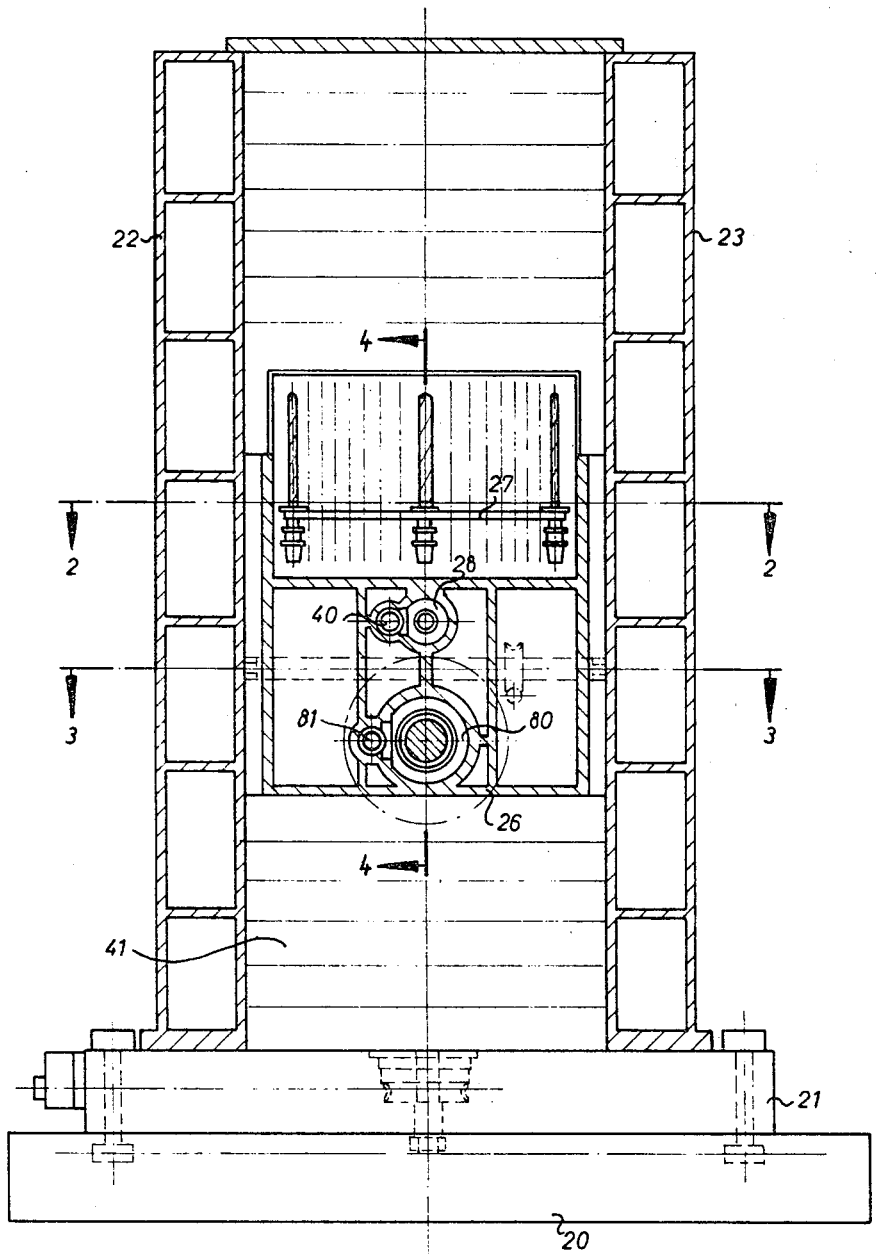
FIG. 1 shows a vertical section through a machine tool in accordance with the invention.

The machine tool shown in the drawing consists of a slide plate 21 which moves on a machine bed 20 in the horizontal, i.e., x-axis. Two columns 22 and 23 are mounted on the slide plate and each column carries two guides 24 and two racks 25 aligned vertically. The machine tool also consists of a slide 26—guided and moving vertically up and down in said guides—which carries a tool magazine 27 and a tool spindle 28. The slide 26 is equipped at the front and back with a drive shaft 29 or 30, on which, in each case, two pinions 31 or 32, which engage with one of the racks 25, are mounted. In addition the two shafts 29 and 30 each carry a worm wheel 33 or 34 which engages with a common worm shaft, which is indicated by its axis 35. This shaft 35 terminates in a drive box 36 at the y feed drive.

Between the two worm wheels 33 and 34, the shaft 35 runs through an adjusting device 37, which operates in conjunction with an electronic spirit level of the known type which is not illustrated. Within the adjusting device 37 the shaft 35 is divided so that the two sections of the shaft can be rotated slightly in relation to each other.

In order to set a required position in the y-axis, the y feed is brought into operation, the shaft 35 rotates, the two shafts 29 and 30 rotate accurately and uniformly and the slide moves up and down, its movement being controlled by the gear wheels 31, 32 and the racks 25. In order to relieve the load on the racks, two hydraulic relief cylinders 38 of the known type are arranged close to the center of gravity of the slide. If the electronic spirit level signifies that the slide, i.e., primarily the tool spindle 28, is not precisely horizontal, e.g., is drawn downwards at the front by a tool with very large reach or very heavy weight, the adjusting device responds and rotates the front section of shaft 35 in relation to the rear section in such a way that the gear wheels 32 lift the front of the slide with the help of the racks 25. It is of course also possible to ascertain whether the center tip of a particularly long tool has fallen out of alignment under its own weight, and by lifting the front of the slide in the manner described, it is possible to compensate such loss of alignment. Lifting of the front side is of course only possible within certain limits to ensure that the slide 26 does not jam in the guides 24 and damage the latter or the racks 25 and the gear wheels 31 or 32 which act in conjunction with the latter.

Above this y adjusting device, a z feed spindle 40 which extends approximately half-way under the magazine 27 is arranged next to the spindle 28; this feed spindle 40 is indicated in FIG. 3 by its axis. The spindle engages in the usual manner in the spindle sleeve so that further description is superfluous.

The space below and above the slide 26, including the tool magazine is covered on all sides by telescopic metal panels 41, the design and arrangement of which do not require discussion in this specification.

The tool magazine 27 arranged above the tool spindle 28 consists in the practical embodiment of the invention illustrated here of a circular disc 45 with recesses open towards the outside to hold tools which are arranged to rotate on a vertical shaft 47. Adjustment of the tool magazine 27 into the required position is effected in the normal way and therefore requires no further discussion here. The tools 46 are mounted in the recesses which are open towards the outside.

As shown in FIG. 1, a further bore 80 is also provided in the slide 26 below the spindle 28. A feed spindle 81 for feed in the z-axis is located next to this bore. In accordance with FIG. 4, a hollow shaft 82 is mounted in this bore 80 and the spindle 83 of a magazine 84 for special tools is mounted in this hollow shaft. As mentioned earlier, we understand by the term special tools, those tools of which a part must be secured to the spindle sleeve, as is the case, e.g., with multiple spindle drilling heads or angle drilling heads. However instead of special tools, particularly bulky tools, e.g., large milling heads, may be housed in the magazine 84.

Figure 5:
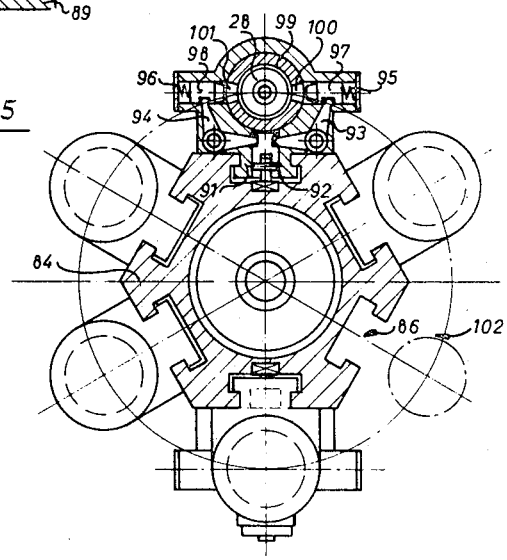
FIG. 5 is an additional tool magazine with a section through a tool holder.

As can best be seen from FIG. 5, the magazine 84 consists of a hexagonal disc with a radial flange 85, which has a T-slot 86 in the axial direction in the center of each side of the hexagon. In the base of each T-slot 86 a cam or inclined surface 87 is provided which has a holding notch 88 at its highest point.

Figure 4:
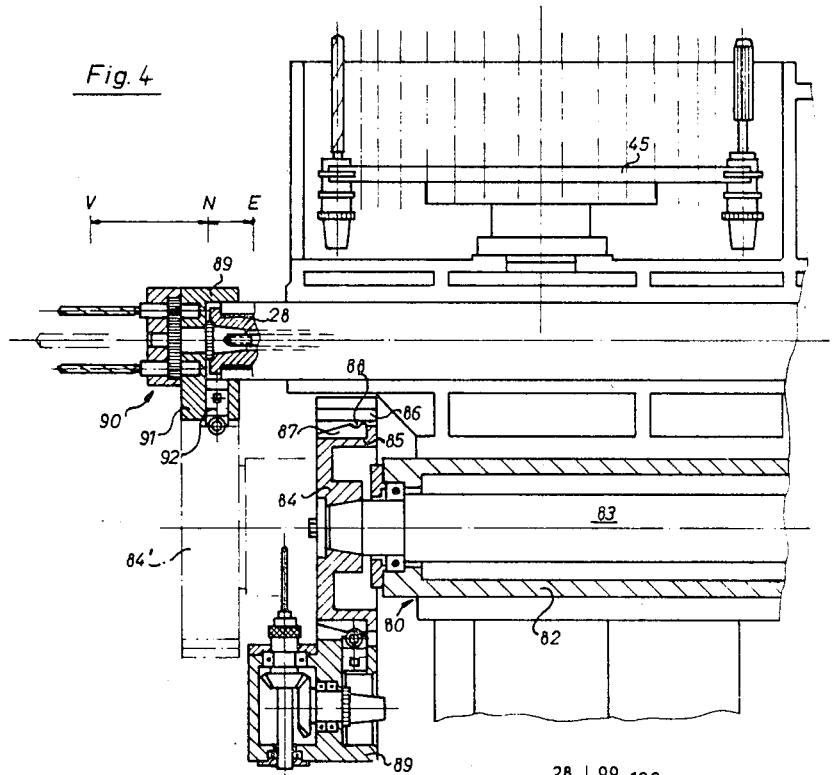
FIG. 4 is a partial sectional view along the line 4—4 in FIG. 1.

The holder 89 of a special tool which must be changed, e.g., a multi-spindle drilling head 90 in accordance with FIG. 4, is equipped with a holding pin 91, corresponding to the T-slot 86 in the magazine 84, a roller bolt 92 being mounted in the pin 91. The roller of this roller bolt 92 acts in conjunction with the cam 87 and the holding notch 88, as shown in the lower part of FIG. 4, in order to secure the holder 89 with a positive connection to the magazine 84, i.e., in T-slot 86.

As can be seen from FIG. 5, an angle lever 93 or 94 also engages in recesses in the roller bolt 92 and the free arms of these levers engage with index pins 97 or 98 which are loaded by springs 95 or 96. Two fitting bores 100 or 101 corresponding to the index pins 97 or 98 are provided in the sleeve 99 of spindle 28.

If, for example, the multi spindle drilling head 90 shown in FIG. 4 is to be changed for a different tool, the magazine 84 travels from the position shown to the position 84, indicated in dotted outline. Cam 87 then pushes the roller bolt 92 upwards, so that the index pins 98 and 97 are lifted out of the fitting bores 100 or 101 by angle levers 93 and 94 against the force of springs 95 and 96, and the locking of holder 89 to spindle sleeve 99 is accordingly broken. At the same time the roller bolt 92 drops into the holding notch 88, so that a certain measure of protection against axial displacement in relation to the magazine 84 is obtained. The tool is clamped to the spindle 28 in the same way as the tools from magazine 45, i.e., with a male taper on the tool and a female taper on the spindle as well as an external gear rim on the tool and an internal gear rim on the spindle.

After releasing, the spindle is retracted, so that the tool magazine can now rotate to a different position with tool 90 now held perfectly in place, i.e., either into an idle position for the magazine 102 (FIG. 5) in which the spindle 28 can be advanced freely so that it is able to operate with tools from the magazine 45, or else into a position in which it can hold another special tool from magazine 84. When a new tool from magazine 84 is clamped, the processes described above take place in the reverse sequence; there is therefore no need for further explanation.

We claim:

1. A machine tool with automatic tool changing for both normal and special tools, comprising:
   a rotatable tool spindle;
   support means for horizontally supporting said spindle, said support means being slidable in horizontal and in vertical directions;
   first tool magazine means supported for rotation around an axis perpendicular to said tool spindle, said first tool magazine being adapted to support a plurality of normal tools;

a second tool magazine means, adapted to support at least one special tool closely adjacent to said tool spindle for automatic insertion directly from said magazine into said spindle, said second tool magazine means being rotatably supported for presenting a selected special tool to said tool spindle for automatic insertion therein.

2. A machine tool as in claim 1 wherein said first and second magazine means are supported by said support means.

3. A machine tool in accordance with claim 2 wherein said first tool magazine is positioned above said tool spindle and is adapted to support upstanding tools, and said second tool magazine is positioned below said tool spindle.

4. A machine tool in accordance with claim 3, characterized in that said additional tool magazine includes a drum rotatably mounted on an axis parallel to the spindle axis, said drum movable axially and having axially aligned parallel fixing grooves adapted to mount the tools and/or holders for the tools.

5. A machine tool with automatic tool changing having a tool magazine for drills and small milling cutters and an additional tool magazine for bulky and/or special tools, characterized in that said additional tool magazine is positioned below the tool spindle with the tools thereon held parallel to the spindle axis for insertion directly from said magazine into said spindle, and further characterized in that the tool magazine includes a drum rotatably mounted on an axis parallel to the spindle axis, said drum movable axially and having aligned parallel fixing grooves adopted to mount the tools and/or holders for the tools, and including a holder for rotatably supporting said tools and a holding pin for each holder corresponding to the fixing groove whereby said holder can be supported on said magazine by said holding pin and moved to a position to be fixed in position on a sleeve housing the spindle.

6. A machine tool in accordance with claim 5 characterized in that the fixing grooves are T-slots.

7. A machine tool in accordance with claim 5 characterized in that the fixing grooves are dovetail slots.

8. A machine tool in accordance with claim 5 including a roller bolt provided in the holding pin, and a cam in said groove with a holding notch located at the highest point of said cam and dimensioned to receive said bolt.

9. A machine tool in accordance with claim 5 characterized in that said holder has two spring-loaded index pins and the spindle sleeve has two fitting bores to match these index pins.

10. A machine tool in accordance with claim 9 including an angle lever mounted on said tool holder engaging each index pin with a free arm of each said lever engageable with said roller bolt whereby said lever holds said index pins out of said spindle sleeve bores when said bolt is in said notch and permits movement of said pins into said bores when said bolt is removed from said notch.

11. A machine tool with automatic tool changing for both normal and special tools, comprising:
a rotatable tool spindle horizontally supported by a support means, said support means being slidable in horizontal and vertical directions,
a tool magazine means supported by said support means for rotation around an axis parallel to said tool spindle and adapted to support at least one special tool adjacent to said tool spindle for insertion thereof directly from said magazine into said tool spindle, said tool magazine being axially movable in a direction parallel to said tool spindle and having fixing grooves extending parallel with the axis of the tool magazine for removably supporting a tool whereby tools can be moved from said magazine onto said spindle.

12. A machine tool in accordance with claim 11 including a holder for each tool constructed for support on said tool magazine and for movement with said tool magazine to a position to mount said tool on said spindle, each of said tool holders including a pin constructed to fit in said fitting grooves for slidable movement into and out of such grooves for respectively mounting and dismounting said holder from the tool magazine.

13. A machine tool with automatic tool changing for both normal and special tools, comprising a rotatable tool spindle horizontally supported by a support means, said support means being slidable in horizontal and vertical directions, a tool magazine means supported by said support means for rotation around an axis parallel to said tool spindle and adapted to support at least one special tool adjacent to said tool spindle for insertion thereof directly from said magazine into said tool spindle, said tool magazine being axially movable in a direction parallel to said tool spindle and having fixing grooves extending parallel with the axis of the tool magazine for removably supporting a tool whereby tools can be moved from said magazine onto said spindle, a holder for each tool constructed for support on said tool magazine and for movement with said tool magazine to a position to mount said tool on said spindle, each of said tool holders including a pin constructed to fit in said fitting grooves for slidable movement into and out of such grooves for respectively mounting and dismounting said holder from the tool magazine, a cam surface in each of said grooves with a holding notch provided in said cam surface, a roller bolt provided on each of said pins for movement along said cam surface and location in said holding notch when said tool holder is positioned for mounting on said tool magazine, a spindle sleeve housing said spindle and having at least one bore therein, at least one spring loaded index pin mounted on said tool holder for insertion into said bore when said tool holder is positioned for mounting a tool on said spindle, an angle lever mounted on said tool holder having one end engaging said index pin and the other end engaging said roller bolt whereby said lever holds said index pin out of said bore when said bolt is in said notch and permits movement of said pin into said bore when said bolt is removed from said notch.

* * * * *